United States Patent [19]

Nepela et al.

[11] Patent Number: 5,309,305
[45] Date of Patent: May 3, 1994

[54] DUAL ELEMENT MAGNETORESISTIVE SENSING HEAD

[75] Inventors: Daniel A. Nepela, San Jose; Erich P. Valstyn, Los Gatos, both of Calif.

[73] Assignee: Read-Rite Corporation, Milpitas, Calif.

[21] Appl. No.: 976,536

[22] Filed: Nov. 16, 1992

[51] Int. Cl.⁵ .............................................. G11B 5/39
[52] U.S. Cl. ..................................................... 360/113
[58] Field of Search ...................... 360/113; 338/32 R; 324/252

[56] References Cited

U.S. PATENT DOCUMENTS 5,132,859  7/1992  Andricacos et al. ............... 360/113
5,193,038  3/1993  Smith ................................... 360/113

Primary Examiner—Robert S. Tupper
Attorney, Agent, or Firm—Nathan N. Kallman

[57] ABSTRACT

A read/write head includes a dual element MR sensor and a superimposed inductive head. In an implementation of the invention, the MR sensor structure includes two spaced magnetoresistive (MR) elements on which antiferromagnetic (AFe) thin films, preferably of iron manganese, are deposited. The AFe thin films act as exchange bias layers with the MR elements, biasing the MR layers in opposite directions and perpendicular to the surface of a magnetic medium. Recorded magnetic signals are sensed differentially and the output signal is characterized by increased amplitude and improved signal-to-noise ratio.

6 Claims, 3 Drawing Sheets

ND_ELEMENT MAGNETORESISTIVE
DUAL ELEMENT MAGNETORESISTIVE SENSING HEAD

FIELD OF THE INVENTION

This invention relates to a magnetoresistive (MR) sensing head assembly and in particular to a thin film MR head incorporating dual MR elements.

DESCRIPTION OF THE PRIOR ART

Inductive write heads are used for recording information on magnetic media, such as magnetic disks. The recorded information can be read out by an inductive read/write head. Alternatively, MR heads can be used for sensing signals which have been recorded on a magnetic medium. The signal sensed by an MR head is proportional to the magnetic flux associated with the recorded signal, and not to the rate of change of flux which is sensed by an inductive head. Thus an MR head can detect a magnetic field representing a recorded signal without any relative motion between the storage medium and the MR head.

A typical thin film MR head incorporates a single MR element, preferably made of a layer of Permalloy having an easy axis of magnetization. During operation of a data storage apparatus, such as a disk drive, an electric sense current is directed to the MR element. The magnetic field being sensed exerts a torque on the magnetic moment in the R thin film causing a change in the resistivity of the film. The change in resistivity is proportional to the strength of the field being measured and causes variations in the resistance of the MR element. Detection of such variations provides a readout signal related to the data signal recorded on the magnetic medium.

Distortion of the readout signal results when the remanent magnetic moment $M_r t$ of the medium or disk is high. Then the MR head periodically saturates, so that the magnetization remains fixed in orientation despite a further increase in the strength of the applied field. In such event, undesirable odd harmonics are produced. Even harmonics are generated as a result of nonlinear variations in the magnetoresistance of the MR head. The even and odd harmonics appear as distortions in the signal being read out.

A small $M_r t$ avoids saturation effects and ensures operation in the linear range of the $\Delta\rho/\rho$ curve, where $\rho$ is the resistivity, but also results in a lower signal. A higher signal can be achieved by increasing the sense current. However, in the standard prior art dual element structure, the sense current applied to each MR element is limited due to the fact that the sense current in one element is the bias current for the other element. The current must be of such a magnitude, typically 3–5 milli-amperes, that the operating point (OP) of each element is in the center of the linear range of the $\Delta\rho/\rho$ curve.

SUMMARY OF THE INVENTION

An object of this invention is to provide an MR head assembly that achieves a significant increase in level of the readout signal.

Another object of this invention is to provide an MR head assembly which avoids the limitation on sense current and realizes a significant increase in output signal amplitude.

Another object is to provide an MR head assembly that allows the use of a magnetic medium or disk having a relatively lower remanent moment (Mrt).

A further object is to provide an MR head assembly that reduces the requirement for close matching of the magnetic properties and thicknesses of MR sensing elements.

According to this invention, a read/write head structure incorporates an MR sensing head and an inductive write head that is superimposed on the MR head structure. The inductive write head is conventional and formed with thin film magnetic layers of Permalloy in a well known manner. The present disclosure is directed to the novel MR head, which is part of the overall read/write head structure.

The MR head of this invention comprises two MR elements or MR layers and two antiferromagnetic (AFe) elements or layers. The MR elements are made of soft Permalloy and the AFe elements are made from an iron manganese alloy (FeMn), for example. Each AFe element is formed adjacent to and is in intimate atomic contact with a respective MR element. Each AFe element is coupled by exchange interaction at room temperature to the MR element and serves as a biasing device. During operation of the MR head assembly in a disk drive, for each combined MR layer and exchange layer, an exchange field $H_e$ is applied in a direction perpendicular to the surface of the disk. The current through a first MR/AFe structure provides a magnetic field to the opposing second MR/AFe structure. This magnetic field is in a direction that is opposite to the exchange field existing at the second MR/AFe structure.

A current-derived field that is sufficient to place a MR/AFe structure at the operating point is required for proper biasing of the MR/AFe structure. The other opposing MR/AFe structure is similarly biased to its operating point, which will be similar or identical for each MR/AFe structure, provided that the thicknesses of the MR and AFe layers respectively are similar or identical for each MR/AFe structure. The exchange fields need to be overcome by the field produced by the applied current, so that the total net field places each of the structures at the operating point. As a result, currents considerably greater than 5 milli-amperes may be used. These larger currents, which are about two to four times those typically used with prior art dual MR heads, result in an increased output signal with minimal distortion.

BRIEF DESCRIPTION OF THE DRAWINGS

The invention will be described in greater detail with reference to the drawing in which.

DETAILED DESCRIPTION OF THE INVENTION

Figure 1:
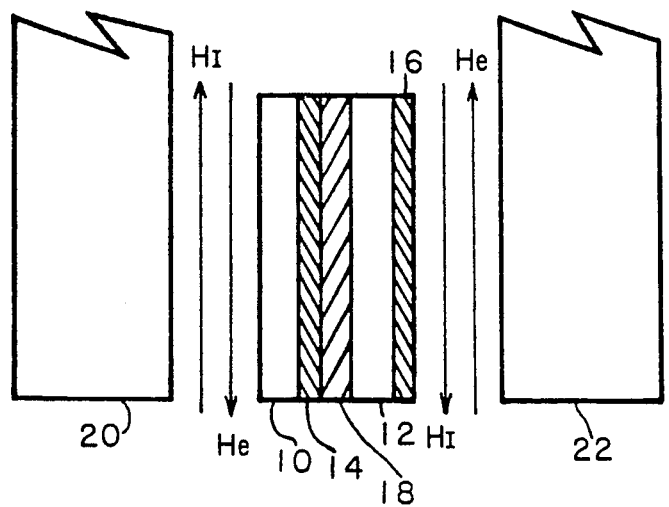
FIG. 1 is a representational view, in section and partly broken away, illustrating a dual MR head assembly, according to this invention.
Figure 2:
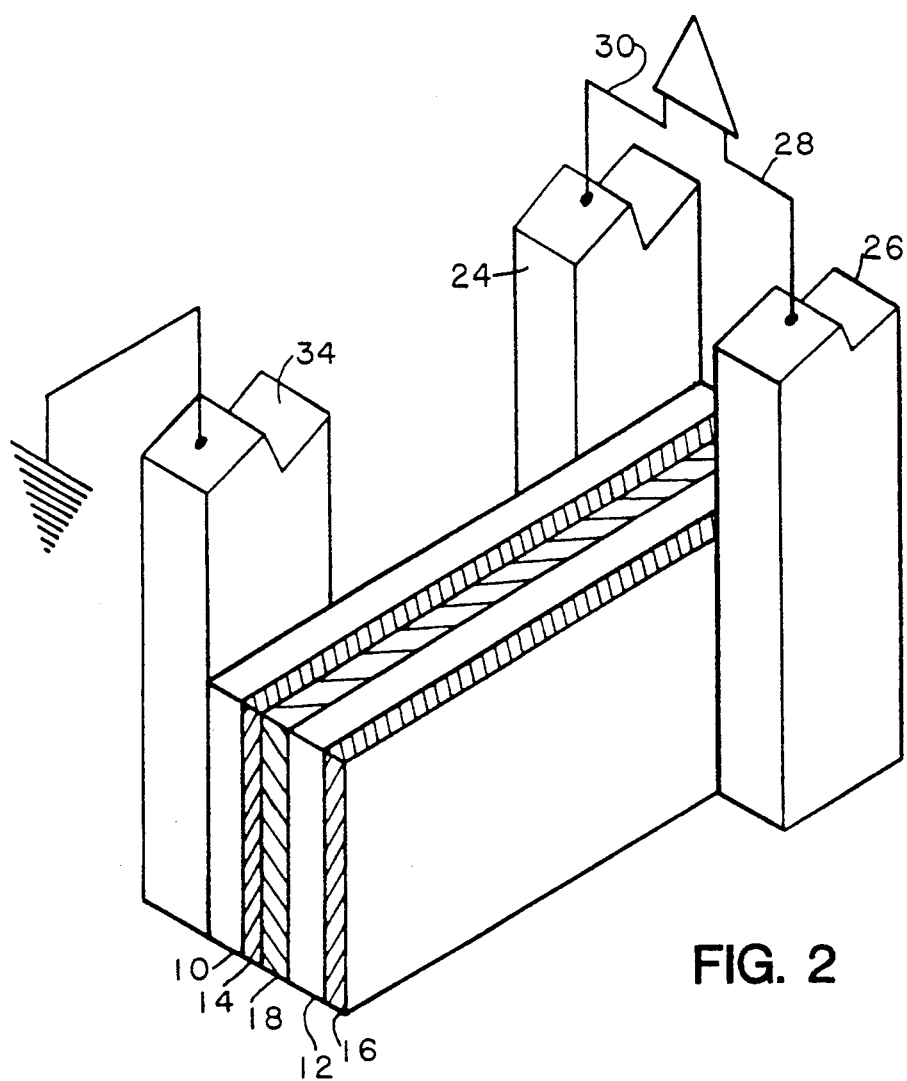
FIG. 2 is a partial isometric view of the MR head assembly of FIG. 1, with shields 20 and 22 omitted, showing conductive leads 26, 24 and 34, the latter two defining the sensing track width of the MR head structure.

With reference to FIGS. 1 and 2, a dual element MR head assembly includes a first MR layer 10 and a second MR layer 12 which are substantially parallel with preferably an insulating oxide layer 18 therebetween. The MR layers 10 and 12 are preferably made of thin films of soft magnetic material having a $\Delta\rho/\rho$ equal to or greater than 1%, each having approximately the same thickness in the range of 100-500 Angstroms, for example.

In accordance with this invention, thin film layers 14 and 16 of antiferromagnetic (AFe) material, such as iron manganese (FeMn), are deposited, by sputtering for example, respectively on the MR layers 10 and 12 and coextensively with the MR layers. A DC field is applied in the desired direction of the exchange field during the sputtering of the first FeMn layer 14 onto the MR layer 10. A DC field is applied in an opposite direction during the sputtering of the second FeMn layer 16 onto the MR layer 12. Each of the FeMn layers 14 and 16 is about 100-300 Angstroms thick. The thin FeMn material locks onto the Permalloy material of the MR layers 10 and 12. The FeMn layers are coupled by exchange interaction to the MR layers 10 and 12 and serve as biasing devices.

The head assembly is shielded by soft magnetic Permalloy shields 20 and 22. The Permalloy shields 20 and 22 are preferably made of a composition of 81% nickel and 19% iron and each shield is about 1.5 to 4.0 microns thick. The head assembly and shields are deposited on and supported by a substrate (shown in FIG. 4), which may be made of a nonmagnetic ceramic material.

To initialize the dual MR head of this invention, a proper exchange bias is provided by passing a current through the magnetostatically coupled pair of MR elements and their associated FeMn antiferromagnetic layers during cooling of the MR/AFe structure, while the assembly of the MR structure and superimposed inductive write head (not shown) is cooled to room temperature after hard baking of the photoresist of the superimposed inductive write head. In this way, the Permalloy elements of the pair of MR structures are saturated in opposite directions and the antiferromagnetic layers are oriented by exchange coupling in the desired directions as the layers become progressively more antiferromagnetic while cooling. In this way, the head structure is initialized.

Figure 3:
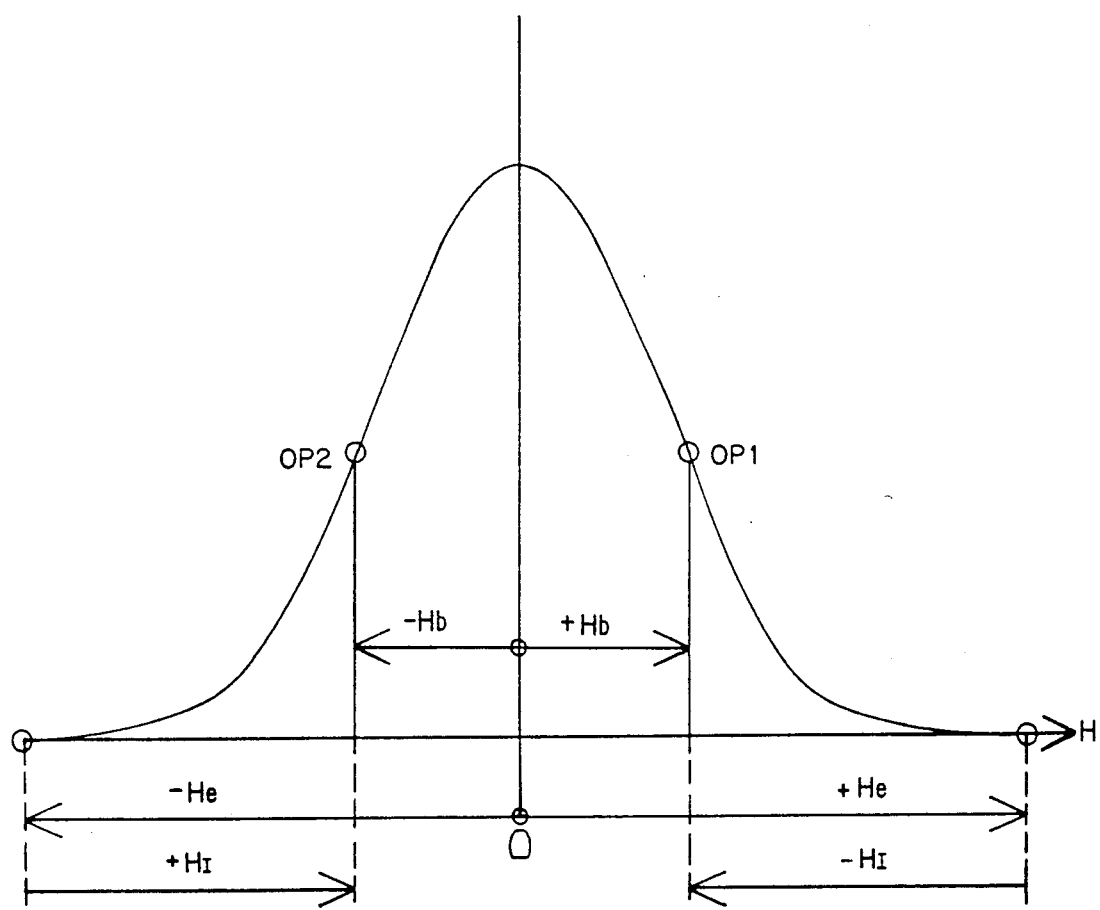
FIG. 3 is a curve showing changes in resistivity in the MR elements plotted against the total field H, and illustrating the range of magnitudes of the exchange field $H_e$ and bias field $H_b$ along the abscissa.

During read operation using the dual MR head assembly, bias current is directed to a conductor 34 (FIG. 2) and the current is split and applied substantially equally to MR elements 10 and 12. A magnetic field H is produced at each MR sensor 10 and 12 by the application of sense current to the conductor pairs 24 and 26. The magnetic field $H_1$ derived from the applied sense current at each sensor biases the other sensor. The current-derived fields that are applied symmetrically and in opposite directions to the sensors overcome the exchange field in each sensor to place both sensors at the operating point (FIG. 3). With this sensor assembly, larger sense currents and thus higher signals are obtained.

In this implementation, the applied sense current is about 2-4 times greater, say about 10-40 milli-amperes, than that which is used with conventional prior art dual MR heads. The applied current produces a magnetic field $H_1$ at each sensor 10 and 12. The magnetic field $H_1$ overcomes the exchange field $H_e$ which is provided by the exchange layers 14 and 16 and applied symmetrically but in opposite directions to the sensors, as illustrated in FIG. 1. The exchange field $H_3$, which measures in the range of 5-20 Oersteds, is applied in a direction that is perpendicular to the surface of the magnetic medium or magnetic disk. Antiferromagnetic elements with larger exchange fields can be accommodated by a change in the angle of the exchange field from 90° relative to the disk surface to a smaller angle.

The dual element MR head with MR layers 10 and 12 senses the recorded signal differentially and the differential signal is fed through leads 28 and 30 to a differential amplifier 32. The differential signal provides common mode rejection of noise from electrical and thermal effects and minimizes harmonic distortion. A higher signal output can be obtained with an increase in signal-to-noise ratio. Also a magnetic medium having a lower Mrt can be used with a resultant increase in signal resolution. As a consequence of the larger sense current and reduced Mrt, there are smaller excursions on the $\Delta\rho/\rho$ curve at the linear regions adjacent to the optimum operating points OP1 and OP2, as shown in the curve represented in FIG. 3. As shown, the magnetization curve is symmetrical relative to the $\Delta\rho/\rho$ axis. With the head design of this invention using exchange layers in conjunction with dual MR layers and media with lower $M_r t$, the specifications for matching the thicknesses and magnetic properties of the two MR elements are less restrictive because the location of the operating points on the $\Delta\rho/\rho$ curve is less critical.

Figure 4:
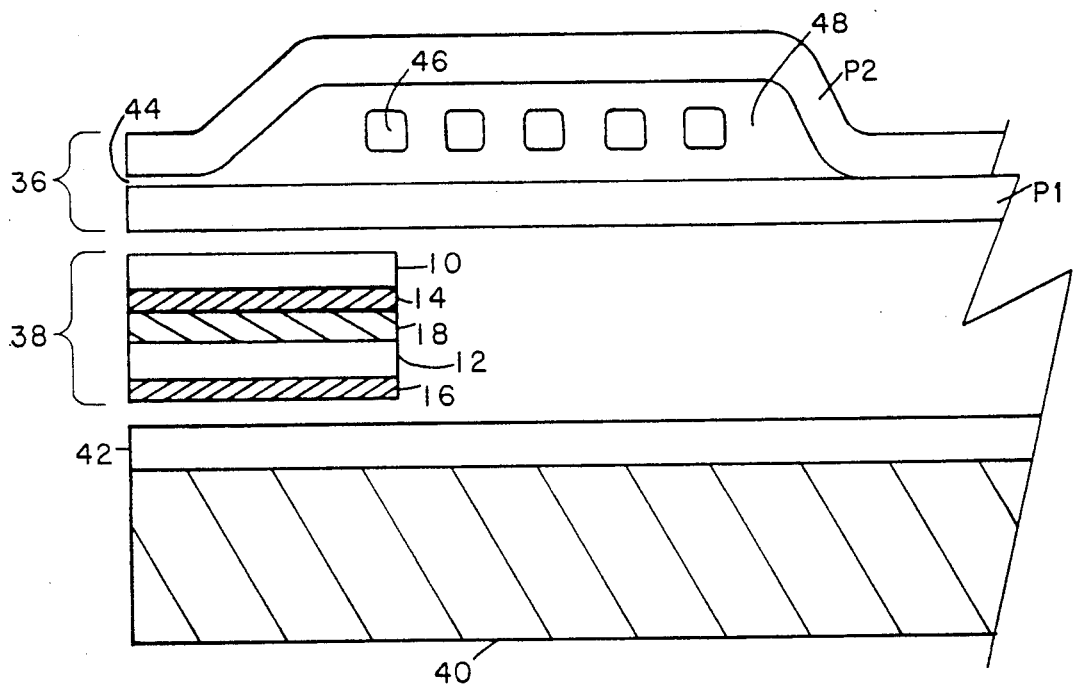
FIG. 4 is a cross-sectional representation, partly broken away, of a combined inductive write head and a dual MR element read head, made in accordance with this invention.

FIG. 4 shows a combined inductive thin film write head 36 and an MR thin film read 38 formed on a substrate 40. The MR head 38 comprises MR layers 10 and 12, AFe layers 14 and 16 and an oxide layer 18, as illustrated in FIG. 1. An insulating oxide layer 42 is disposed between the substrate 40 and the MR sensing head 38. The thin film write head 36 comprises a first Permalloy layer P1 and a second Permalloy layer P2 which form a continuous magnetic path with a transducing gap 44. An electrical coil layer 46 is deposited between the P1 and P2 layers and insulation 48 isolates the coil 46 from the Permalloy pole pieces P1 and P2 to prevent electrical shorting. Electrical lead connections to the MR layer 10 and to the Afe element 16 are illustrated in FIG. 2. The combined inductive write head/dual element MR read head has the advantages of increased signal output without limitation o the sense current and improved signal-to-noise ratio. The requirement for close matching of the two MR elements is minimized.

It should be understood that the invention is not limited to the parameters, dimensions and materials set forth above and that modifications may be made within the scope of this invention. For example, the locations of the exchange layers 10 and 12 may be reversed with the AFe layers 14 and 16 respectively.

What is claimed is:

1. A signal sensing head for reading signals recorded on a magnetic medium comprising:
    spaced first and second magnetoresistive elements;
    an insulating layer disposed between said first and second magnetoresistive elements;
    a first antiferromagnetic film disposed between said first magnetoresistive element and said insulating layer;

a second antiferromagnetic film disposed on said second magnetoresistive element and spaced from said insulating layer;

wherein each of said magnetoresistive element have a thickness in the range of about 100-500 Angstroms, and each of said antiferromagnetic films have a thickness in the range of about 100-300 Angstroms.

2. A sensing head as in claim 1, including first and second soft magnetic shields, said first magnetic shield being disposed adjacent to said first magnetic element and said second magnetic shield being disposed adjacent to said second antiferromagnetic film.

3. A sensing head as in claim 2, wherein said shields are made of Permalloy, each being about 2.5 microns thick.

4. A sensing head as in claim 1, wherein said antiferromagnetic thin films are made of iron manganese.

5. A sensing head as in claim 1, wherein said antiferromagnetic thin films are coextensive with said magnetoresistive elements.

6. A sensing head as in claim 1, wherein said antiferromagnetic thin films provide an exchange-bias field to said magnetoresistive elements directed substantially perpendicularly relative to the surface of said magnetic medium.

* * * * *